(12) United States Patent
Turbell et al.

(10) Patent No.: US 8,290,245 B2
(45) Date of Patent: Oct. 16, 2012

(54) MEASURING APPARATUS AND METHOD FOR RANGE INSPECTION

(75) Inventors: Henrik Turbell, Linkoeping (SE); Mats Gokstorp, Vreta Kloster (SE)

(73) Assignee: Sick IVP AB, Linkoping (SE)

( * ) Notice: Subject to any disclaimer, the term of this patent is extended or adjusted under 35 U.S.C. 154(b) by 1091 days.

(21) Appl. No.: 11/630,947

(22) PCT Filed: Jun. 13, 2005

(86) PCT No.: PCT/SE2005/000887
§ 371 (c)(1),
(2), (4) Date: Dec. 27, 2007

(87) PCT Pub. No.: WO2006/004483
PCT Pub. Date: Jan. 12, 2006

(65) Prior Publication Data
US 2008/0204763 A1 Aug. 28, 2008

(30) Foreign Application Priority Data
Jul. 1, 2004 (EP) .................................... 04015541

(51) Int. Cl.
*G06K 9/00* (2006.01)
*G01B 11/30* (2006.01)
*H01L 25/00* (2006.01)

(52) U.S. Cl. ........... 382/154; 382/131; 356/603; 25/332

(58) Field of Classification Search .................. 382/154, 382/147, 151, 286, 150, 145, 148, 166, 141, 382/291, 144, 131, 128, 100; 348/132, 93, 348/92, 126, 87, 154, 208.4, 208.16, 131; 250/559.34, 341.8, 341.7, 559.4, 559.46, 250/332; 356/237.2, 241.1, 237.4, 239.1, 356/394, 615, 612, 603, 401, 614; 378/901
See application file for complete search history.

(56) References Cited

U.S. PATENT DOCUMENTS
5,753,931 A * 5/1998 Borchers et al. ......... 250/559.22
(Continued)

FOREIGN PATENT DOCUMENTS
WO 98/45808 A1 10/1998
(Continued)

OTHER PUBLICATIONS
European Search Report issued on Nov. 17, 2004, for EP Patent Application No. 04015541.8, 3 pages.

*Primary Examiner* — Sheela Chawan
(74) *Attorney, Agent, or Firm* — Kilpatrick Townsend & Stockton LLP (57) ABSTRACT

The present invention relates to an imaging apparatus and method for measuring the three-dimensional characteristics of an object using range data acquisition and analysis. The imaging apparatus comprises: means for configuring the range data acquisition and analysis before starting the measuring; means for creating an image of the object by detecting reflected light from the object using at least one sensor comprising pixels; means for acquiring range data of the object from the created image measured in sensor pixel units; means for calibrating the acquired range data from sensor pixel values to world-coordinates; means for rectifying the calibrated range data by re-sampling the range data onto a uniformly spaced grid; and, means for analyzing the calibrated and rectified range data in order to obtain the three-dimensional characteristics of the object.

14 Claims, 6 Drawing Sheets

U.S. PATENT DOCUMENTS

| | | |
|---|---|---|
| 5,999,840 A | 12/1999 | Grimson et al. |
| 6,141,105 A | 10/2000 | Yahashi et al. |
| 6,292,263 B1 | 9/2001 | Norita et al. |
| 6,542,235 B1 * | 4/2003 | Caskey et al. .................. 356/394 |
| 6,542,249 B1 * | 4/2003 | Kofman et al. ................ 356/601 |
| 6,744,848 B2 * | 6/2004 | Stanton et al. .................. 378/55 |
| 7,027,639 B2 * | 4/2006 | Fishbaine ..................... 382/150 |
| 2002/0131056 A1 | 9/2002 | Fujii et al. |
| 2002/0191834 A1 | 12/2002 | Fishbaine |

FOREIGN PATENT DOCUMENTS

| | | |
|---|---|---|
| WO | 00/21034 A1 | 4/2000 |

* cited by examiner

MEASURING APPARATUS AND METHOD FOR RANGE INSPECTION

This application is a U.S. National Phase of PCT patent application PCT/SE2005/000887 filed Jun. 13, 2005, which claims the priority of European Patent Application 04015541.8 filed Jul. 1, 2004, the disclosures of both of which are incorporated herein by reference.

BACKGROUND OF THE INVENTION

1. Field of the Invention

The present invention relates to the field of measuring apparatuses, and particularly to a measuring apparatus allowing for measuring the three-dimensional characteristics of an object by using range data acquisition and analysis as well as a method for such measuring.

2. Description of the Related Art

Two-dimensional (2D) smart cameras combine 2D image acquiring, processing, and analyzing into a single device wherein all of the functionality is highly configurable. Several processing steps can be applied in any order. The output from one step can be used to configure subsequent steps. Intermediate values can be stored and used at a later stage. These values can then control aspects such as the data flow, the output format, and parameters in the processing and analyzing. This highly configurable analysis is called dynamic analysis. This is opposed to static analysis, where the same analysis step sequence is performed on each image regardless of intermediate results.

A typical inspection task is to first locate an object shape which has been taught to the system. Once located, features such as areas, edges, or corners of the object can be determined. The properties of the features are then analyzed and the result is typically some form of classification result (e.g. accepted/rejected), a measurement (e.g. object area), or a combination of such values.

The configuration is performed by attaching a PC or other control hardware to the device. The configuration is typically made using some form of graphical user interface where acquired images are shown as an aid in the configuration. After configuration, the device can run as a stand-alone product without any PC or other control hardware connected.

However, it is not possible to acquire and process range data, also known as three-dimensional (3D) data, in these types of units.

Range imaging is used to obtain a set of range values, and compared to ordinary 2D imaging the pixel values of a range image do not represent the light intensity, but rather the distance between the camera and the measured object. There are a number of well-known techniques for measuring range data. These include laser triangulation, structured light imaging, time-of-flight measurements and stereo imaging.

A number of commercially available devices produce range data as output. These devices are typically adapted to a processing unit, such as a PC, for processing, analysis and/or storage of the range data. These devices output a stream of range data values. The values can be organized in different ways. A one-dimensional set of range values measured along a line across the object is referred to as a profile. A number of subsequent profiles form a range image. Just as an ordinary two-dimensional image, the range image consists of a two-dimensional set of pixels. The difference is that the pixel values of the range image depict shape rather than light intensity.

A number of commercially available range imaging products process the data before producing an output. The output is then the result of the processing. All of these products process the range values on a profile-per-profile basis. The processing is limited to produce a single measurement such as the profile area or the position of an edge. The analysis is static in the sense discussed above. An example of such a range imaging product is the sheet-of-light sensor DMH from SICK AG, Germany.

The level of configuration available in existing range imaging devices and the profile-per-profile analysis are not sufficient for many inspection tasks. The user typically needs to develop custom software functionality outside of the device that processes the range data in order to obtain useful properties of the scanned object. Just as in a 2D smart camera, a typical inspection task consists of locating one or more objects in an image and then performing different measurements on the found objects. The results should be reported according to some user-configurable protocol to other devices. Such dynamic analysis is not available in existing range imaging devices.

One prior art approach is shown in U.S. Pat. No. 6,542,235, which discloses a three-dimensional inspection system for inspecting circular parts. The system comprises one to four cameras which generate profile signals of a part to be inspected. The profile signals are forwarded to a computer which analyzes the signals and generates a 2D height image of the inspected part. The height image of the inspected part is analyzed by comparing it to known good part data in order to determine whether the inspected part is satisfactory or unacceptably defective. The system is user-configurable to some degree, e.g. operator-selected distance between parts to be inspected, operator-selected part number for inspection, operator-started inspection process, etc. In addition, the system may be calibrated from typical "pixels" to real world units, such as square inches or square millimeters per area and inches or millimeters for linear measures.

However, the system according to the above-described document is not highly user-configurable in the sense of a 2D smart camera as discussed above. Further, the above-described system is used for inspecting circular parts, i.e. symmetrical parts (objects). The use of calibrated height images (from pixel units to real world units) as input to a 2D image analysis system, when the object has an asymmetrical shape, will result in that presented objects vary in size and shape depending on the position relative to the camera. These distortions are generally not handled properly by the calibration functionality found in existing analysis systems.

There is therefore a need for an improved imaging apparatus and method for measuring the three-dimensional characteristics of an object, which combines the flexible configuration abilities of a 2D smart camera with the data acquisition of a range camera into a single unit, and which overcomes the distortion problem stated above.

SUMMARY OF THE INVENTION

Taking the above into mind, it is an object of the present invention to obviate the distortion drawbacks of the above described systems and to provide an improved imaging apparatus for measuring the three-dimensional characteristics of an object using range data acquisition and analysis.

This object is achieved through providing an imaging apparatus which comprises:

means for configuring the range data acquisition and analysis before starting the measuring;

means for creating an image of the object by detecting reflected light from the object using at least one sensor comprising pixels;

means for acquiring range data of the object from the created image measured in sensor pixel units;

means for calibrating the acquired range data from sensor pixel values to world-coordinates;

means for rectifying the calibrated range data by re-sampling the range data onto a uniformly spaced grid; and, means for analyzing the calibrated and rectified range data in order to obtain the three-dimensional characteristics of the object.

A further object of the present invention is to provide an improved method for measuring the three-dimensional characteristics of an object using range data acquisition and analysis.

This further object is achieved through providing a method comprising the steps of:

providing means for configuring the range data acquisition and analysis before starting the measuring;

creating an image of the object by detecting reflected light from the object using at least one sensor comprising pixels;

acquiring range data of the object from the created image measured in sensor pixel units;

calibrating the acquired range data from sensor pixel values to world-coordinates;

rectifying the calibrated range data by re-sampling the range data onto a uniformly spaced grid; and, analyzing the calibrated and rectified range data in order to obtain the three-dimensional characteristics of the object.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

In the following a preferred embodiment of an imaging apparatus for acquisition of range images with a user-configurable smart range camera will be described.

Figure 1:
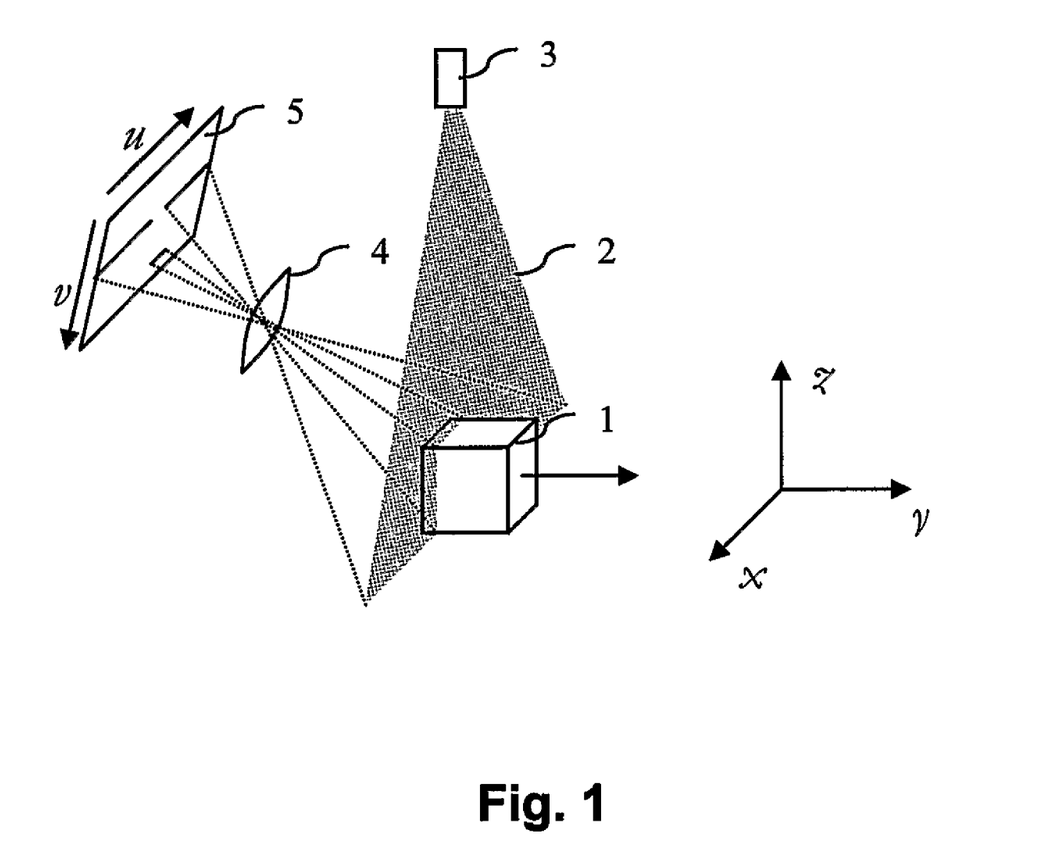
FIG. 1 illustrates schematically an imaging apparatus for measuring the three-dimensional characteristics of an object.

FIG. 1 illustrates schematically an imaging apparatus for measuring the three-dimensional characteristics of an object 1. The apparatus comprises at least one light source 3 arranged to illuminate the object 1 with incident light. The light source 3 generates structured light, for example point light, linear light or light composed of multiple, substantially point or linear segments, and may be of any type suitable for the application, for example a laser, a light-emitting diode (LED), ordinary light (light bulb) etc, which are familiar to the person skilled in the art and will not be described further herein. Laser light is preferably used in the preferred embodiment of the present invention and the laser light source 3 generates a line of light 2 across the object 1.

An imaging sensor 5 is placed a predetermined distance from the light source 3 and arranged to detect reflected light from the object and to convert the detected light into electrical signals. The electrical signals are used for creating a digital representation of the illuminated cross-section of the object 1. Optics 4, e.g. a lens, is arranged in front of the sensor 5 in order to collect reflected light from the object 1.

In the preferred embodiment the sensor 5 is an array sensor with uxv pixels (where u is columns and v is rows) but a person skilled in the art will appreciate that the invention may be applied to other types of sensors, such as CCD sensors or CMOS sensors or any other sensor suitable for imaging characteristics of an object. The sensor 5 is in the present system capable of detecting both two-dimensional (2D, intensity) and three-dimensional (3D, range data) information, i.e. is capable of measuring both intensity distribution and geometric profile of the object. The range data is in the preferred embodiment obtained by using triangulation i.e. the position of the reflected light on the sensor 5 indicates the distance from the sensor 5 to the object 1 when the light source 3 is placed a predetermined distance from the sensor 5. Other techniques used for measuring range data are other structured light imaging, time-of flight measurements and stereo imaging. In stereo imaging, the image of the object is obtained from two sensors placed on two distinct vantage spots, and a corresponding point on each sensor is located on the image of the object 1, whereby triangulation is performed to compute the 3D coordinates of these points.

The 2D intensity information in itself helps in the detection of the object 1, but may also be used as a confidence measurement of the quality of the range data. Occasionally the sensor 5 does not detect any reflected light; this phenomenon is called "missing data". The cause of missing data may have two explanations: either the sensor will not detect any reflected light since the laser is occluded; or the sensor will not detect any reflected light since the light is either absorbed or reflected away from the receiver, e.g. when the object has dark and/or very reflective color. This phenomenon will be described in further detail in conjunction with the description of FIG. 3.

The sensor 5 may further be capable to detect scattered light, i.e. the dispersion of the light in the surface layer of the object 1. Light penetrating the material is registered and after dispersion emerges from the object 1 at a different location from that at which it entered. How this occurs depends on the internal characteristics of the object material, which in this way can be measured.

The object 1 and the imaging apparatus are moved in relation to one another in a predefined direction of movement, in the y-direction shown in FIG. 1. In the preferred embodiment of the present invention the object 1 moves relative to the imaging apparatus 6. The object 1 may e.g. be placed on a conveyor belt which moves or, alternatively, there is no belt and the object 1 itself moves. Instead of the object 1 moving relative to the imaging apparatus 6, the relationship may be reversed; that is to say, the object 1 is stationary and the imaging apparatus 6 moves over the object when measuring. In still another embodiment both the object 1 and the imaging apparatus 6 move in relation to each other.

The sensor 5 is arranged to detect range information of the object 1 in a plurality of cross-sections of the object illuminated by the light source 3; i.e. it is arranged to repeatedly measure (scan) the object 1 when the object 1 is moved in the y-direction, in order to obtain a plurality of cross-section images which are put together into a range image of the object 1.

In the preferred embodiment the imaging apparatus 6 is a stand-alone unit, comprising means for acquisition of range images, means for describing the shape of the inspected object, and means for subsequent user-configurable analysis. The fact that the apparatus is a stand-alone unit makes it reliable, requires little storage resources, and a system comprising only one unit is easy to handle.

Figure 2:
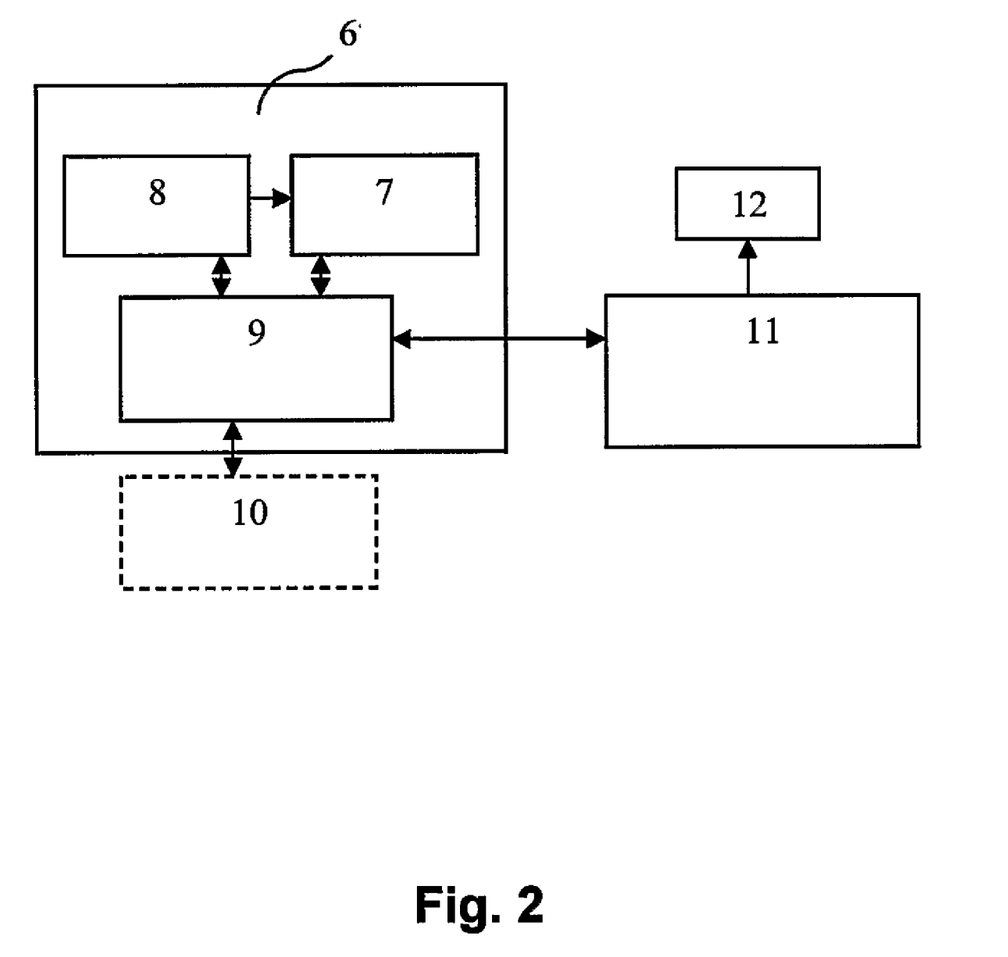
FIG. 2 illustrates schematically the different components of an imaging apparatus.

FIG. 2 illustrates schematically the different components of the imaging apparatus 6 according to a preferred embodiment of the present invention. The imaging apparatus 6 comprises means 8 for acquiring range data of the object 1. The acquisition means 8 is in this context called a vision front-end. The vision front-end 8 will be described in further detail in conjunction to the description of FIG. 3.

The imaging apparatus 6 further comprises an analyzer 7 arranged to dynamically analyze the range data delivered from the vision front-end 8. The analyzer 7 comprises software that performs dynamic analysis of the data from the vision front-end 8. The analyzer 7 may comprise special hardware, for example digital signal processors (DSP:s), that increase the time performance of some analysis tasks such as image filtering. The analyzer 7 may also comprise a general purpose micro processor and means for outputting the processed and analyzed data.

The imaging apparatus 6 still further comprises a control and communications module 9 arranged to control the vision front-end 8 and the analyzer 7. The control and communications module 9 outputs the result of the dynamic analysis as control signals to other modules of the apparatus. The module is also responsible for getting the system operational when powered on, which includes fetching stored configurations from a permanent memory. The control and communications module 9 further comprises means for configuration of the vision front-end 8 and the analyzer 7, and it is arranged to handle communication with a configuration device 11 and other external devices 10, which in the preferred embodiment is a Personal Computer (PC). The vision front-end 8 and the analyzer 7 are configured using an external configuration device 11, for example a PC. The PC runs a graphical user interface on a screen 12 where both the image acquisition and the dynamic analysis may be configured.

When configuring the data acquisition, different parameters may be changed for example exposure time, field-of-view and sensor gain. It is also possible to select laser peak extraction algorithm and enable or disable pre-processing steps such as for example calibration and rectification, which will be described in further detail below.

The configuration of the dynamic analysis comprises at least one basic analysis task which hereinafter will be called tool. Each tool has a number of input parameters and a number of output result values. The output from one tool can be used as input to other tools. Both inputs and outputs may be numerical values, images, or textual values. The execution order of the tools may be specified explicitly by the user or may be derived implicitly by the system based on the input-output relationships between the tools. For example, if an edge detection tool requires an image region of interest as input, it is possible to automatically deduce that the object finding tool returning this region of interest should be executed before the edge detection.

The analysis configuration is made in an interactive graphical manner. The user can apply different tools and get interactive feedback on the results from each applied tool. One important form of feedback is intermediate result images. The images can have overlaid graphics showing extracted features such as objects, corners, or edges. Other forms of feedback include numerical or textual output values and error messages. Some tools do not contain any image processing functionality, but are instead used for controlling the tool execution order. Such tools introduce iteration and conditional or unconditional branching in the tool execution order.

Some tools are concerned with communication. One example is a tool that sends a message containing measurement results of other tools. Another example is a tool that sets a digital or analogue value of an output signal of the system. As an alternative or complement to control communication using tools, there can be some other form of system functionality that handles communication.

Figure 3:
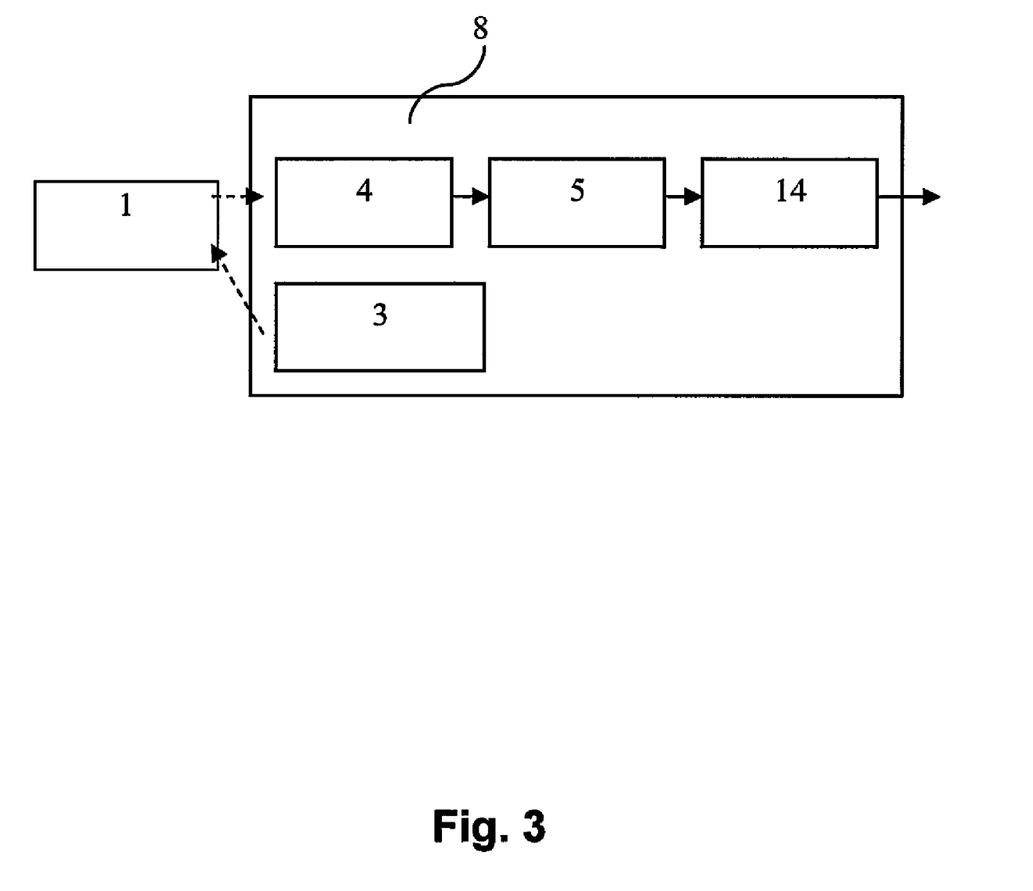
FIG. 3 illustrates schematically the components of the vision front-end of the imaging apparatus.

FIG. 3 illustrates schematically the components of the vision front-end 8. As can be seen from the figure, the component parts in the system setup shown in FIG. 1 are, in the preferred embodiment of the invention, all built-in into one single unit, the vision front-end 8. The vision front-end 8 is mainly arranged to acquire range data (a range image) and it comprises: a light source 3 for illuminating the object 1 with incident light, preferably laser light; a sensor 5 arranged to detect reflected light from the object and to convert the detected light into an image of the object 1; and, light collecting optics 4 arranged in front of the sensor 5.

The vision front-end 8 further comprises a pre-processor 14 arranged to process the acquired image and to locate the position of the incident light. The pre-processor 14 may also perform calibration and rectification as described below.

The vision front-end 8 still further comprises means for identifying missing data and these means are arranged to accomplish the step of identifying missing data. When using laser triangulation, parts of the projected laser can be occluded by the object to be inspected. This leads to unknown range measurements called missing data, i.e. identifying positions in the created image where valid data is missing. Measurements with missing data are identified by the vision front-end 8 and the corresponding pixels of the range image are marked with a special value to flag for the missing data. Typically, the value 0 (zero) is used. Missing data also occur in other range imaging techniques different from laser triangulation.

For some inspection tasks, the shape and position of the missing data region contain important information. It may be the object feature that occludes the laser light that is to be measured and the analysis tools can be used to locate and perform measurements on the region of missing data. In other measurement tasks, the missing data is of no interest and must be handled in a separate way in order not to influence the analysis. The position of the missing data depends on the rotation of the inspected object. For rotation-invariant identification of the object, the missing data region needs to be ignored by the object finding tool. This can be realized in two ways. The tools can be programmed to ignore all pixels with missing data. Alternatively, the missing data regions can be filled with range values estimated from the valid pixels around the missing regions using some form of interpolation and/or extrapolation. This pre-processing can be done by a separate tool or in the pre-processing module 14 of the vision front-end 8. After the missing data regions have been filled, tools not developed to handle missing data can be applied to the processed range image.

The vision front-end 8 comprises means for measuring range information and it may further comprise means for acquisition of additional information such as: the grayscale intensity of the extracted line; the grayscale intensity for other light sources than laser light, such as polarized light or direct white light; the color of the object; and, the scattering properties of the object surface.

So, for each range measurement there may be one or more related measurements; this is called multi modal data. Each modality of the measurements will hereinafter be called a component. The data of each component can be organized as a 2D image. The output from the vision front-end 8 is then not a single range image, but a set of images. There is one image for each component.

The analysis of the multi modal images can be performed in a similar manner as in the pure range image case. Tools can be applied to each component image independently. For example, a bar-code reading tool can be applied to the intensity image followed by a volume measurement tool operating on the range image. Some tools can operate on more than one image at a time, combining the information from two or more components in order to perform more sophisticated and discriminative analysis.

The laser line extraction in the vision front-end returns range values measured in sensor pixel units. Each column u of the sensor has one range value v. Assuming a constant object movement and constant sampling rate the two axes of the range image are in the n- and y-direction respectively. The pixel values are in the v-direction. It is often useful to convert the sensor-coordinate values into world-coordinates (x, y, z) expressed in some suitable unit, such as millimeter, and the method of doing so will hereinafter be called calibration. All range data of a single profile are placed in the same laser plane of constant y. The mapping of interest is therefore from sensor-coordinates (u, v) to world-coordinates (x, z).

The vision front-end is rigidly mounted in the device. The mapping from (u, v) to (x, y) is therefore assumed to be constant once the device has been assembled. After assembly it is therefore possible to find the mapping by means of presenting objects of known dimensions at known positions in the measurement field-of-view of the device. Once calibrated, it is straightforward at run-time to map each range measurement (u, v) into world-coordinates (x, z) by means of table look-up or evaluation of a pre-calculated mathematical expression. The result is two images, both with axes along u and y. The pixel values of the first image are in the x-direction and the pixel values of the second image are in the z-direction.

Figure 4A:
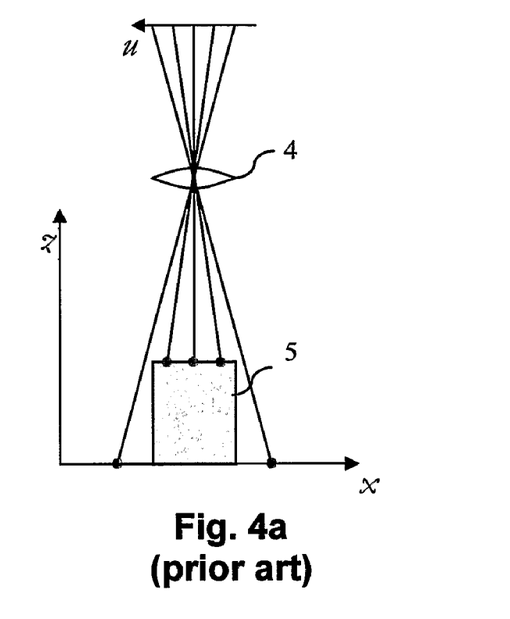
FIG. 4a illustrates an acquisition setup in a prior art approach wherein one range position is obtained along each drawn ray.

FIG. 4a illustrates an acquisition setup in a prior art approach wherein one range position is obtained along each drawn ray. The use of calibrated range images as input to an external 2D image analysis system is a known technique and these range images are not sampled on a Cartesian (x, y) grid. The sampling pattern is instead defined by the imaging sensor, resulting in one range value per sensor column u, shown in FIG. 4a and discussed above. The consequence of using this method is that the presented objects will vary in size and shape depending on the position (in x and z) relative the imaging apparatus.

Figure 4B:
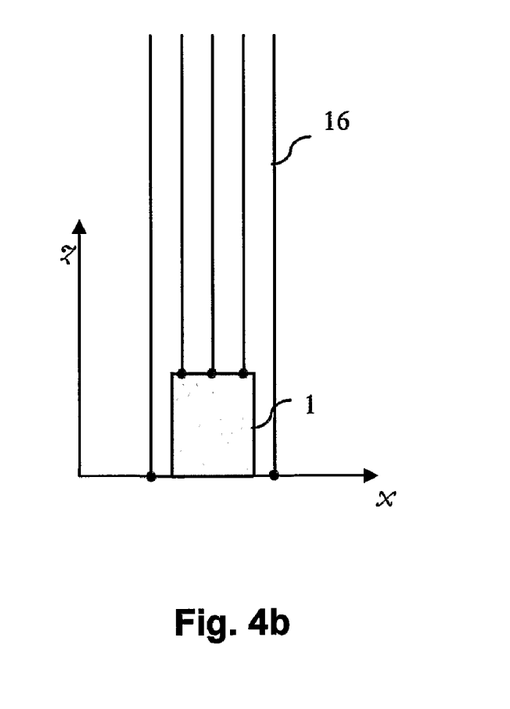
FIG. 4b illustrates an acquisition setup after rectification wherein one range position is obtained along each virtual ray.

The calibration functionality in the above-described prior art analysis systems do not properly handle the distortions described above. In the preferred embodiment of the present invention this problem is solved by rectifying the image of the object 1 before processing. FIG. 4b illustrates an image acquisition setup after rectification, wherein one range position is obtained along each virtual ray 16. The method of rectification re-samples the range data onto a uniformly spaced (x, y)-grid before presenting it to the analyzer. This enables true translation invariant analysis of the range image. The interpolation in the rectification can be made to a sampling grid along an x-direction of arbitrary resolution. For some inspection tasks it can be advantageous to have the same resolution in the x-direction as in the y-direction. It is then relatively easy to perform analysis that is independent of object rotation around the z-axis.

Figure 5A:
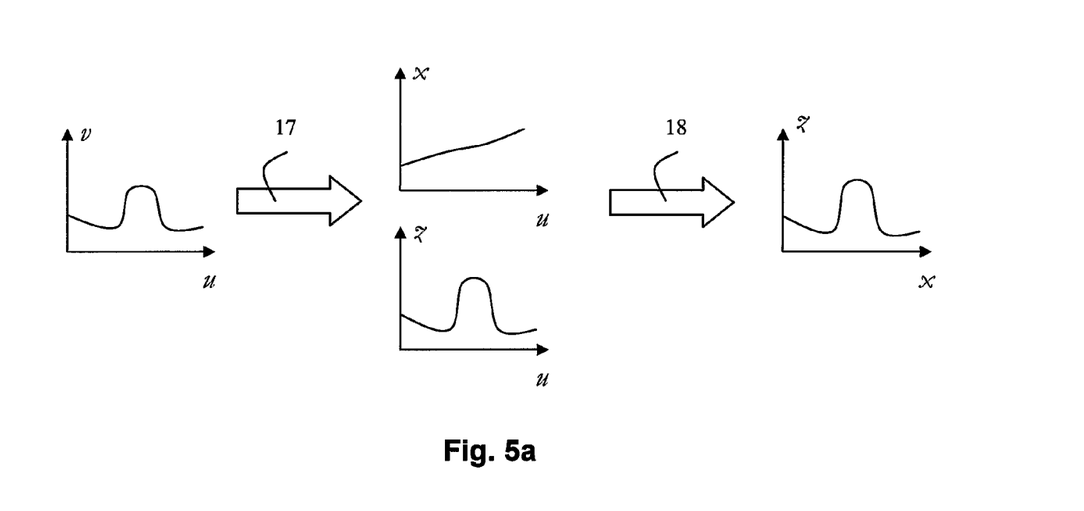
FIG. 5a illustrates coordinate systems used in a calibration and rectification of a single profile.
Figure 5B:
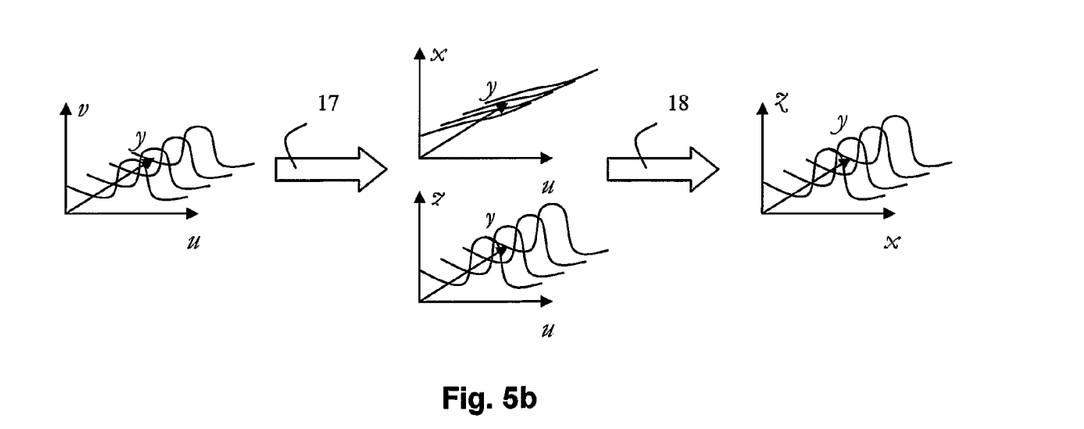
FIG. 5b illustrates coordinate systems used in calibration and rectification of a sequence of profiles.
Figure 5C:
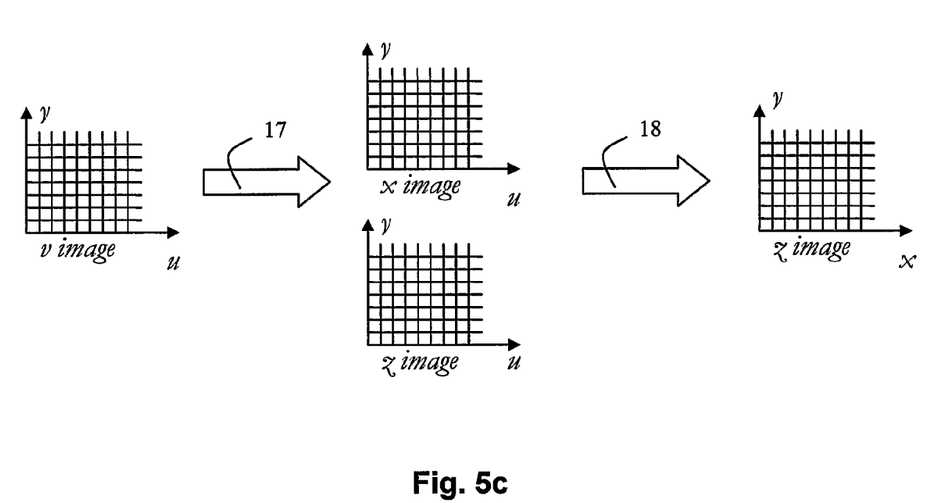
FIG. 5c illustrates coordinate systems used in calibration and rectification of a sequence of profiles seen as images.

FIG. 5a illustrates coordinate systems used in a calibration 17 and rectification 18 of a single profile, FIG. 5b illustrates coordinate systems used in calibration 17 and rectification 18 of a sequence of profiles, and FIG. 5c illustrates coordinate systems used in calibration 17 and rectification 18 of a sequence of profiles seen as images.

As can be seen from FIGS. 5a-5c, the result of the calibration 17 is two images, both with axes along u and y. The pixel values of the first image are in the x-direction and the pixel values of the second image are in the z-direction as discussed above. The result of the rectification 18 is one image with axes along x and y. The pixel values are in the z-direction. It is to be understood that for the sequence of profiles, shown in FIGS. 5b and 5c, the calibration 17 and rectification 18 is made separately for each sequence.

In the calibration 17 and rectification 18 of the image of the object, shown in FIGS. 5a-5c, a vertical laser light source is used. If an inclined laser light source is used, i.e. the laser light is incident with an angle on the object, the rectification has to be performed in two dimensions. Thus, the calibration results in three images and there will be an additional intermediate rectification step before one rectified image is obtained. The same applies if e.g. stereo imaging is used for measuring the range data.

In the following will be described a method for measuring the three-dimensional characteristics of an object, comprising the steps of:

providing means for configuring the range data acquisition and analysis before starting the measuring;

creating an image of the object by detecting reflected light from the object using at least one sensor comprising pixels;

acquiring range data of the object from the created image measured in sensor pixel units;

calibrating the acquired range data from sensor pixel values to world-coordinates;

rectifying the calibrated range data by re-sampling the range data onto a uniformly spaced grid; and, analyzing the calibrated and rectified range data in order to obtain the three-dimensional characteristics of the object.

In a further embodiment, the configuration of the range data analysis comprises basic analysis tasks having at least one input parameter and at least one output result value, whereby the output result value from a first analysis task is used as input parameter to a second analysis task.

In a still further embodiment the method comprises the step of identifying pixel positions in the created image where valid data is missing, whereby the identified pixel positions in the created image where data is missing is either ignored or is filled with range values estimated from the valid pixels around the pixels where data is missing using interpolation and/or extrapolation.

In another embodiment the method further comprises at least one of the following steps: acquiring grayscale intensity data from the created image of the object; and/or, measuring the scatter properties of the object surface.

In still another embodiment triangulation is used for creating the image of said object.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for measuring three-dimensional characteristics of an object using range data acquisition and analysis, comprising the steps of:
   providing means for configuring the range data acquisition and analysis before starting the measuring;
   creating an image of said object by detecting reflected light from said object using at least one sensor comprising pixels;
   acquiring range data of said object from the created image measured in sensor pixel units;
   converting the acquired range data from sensor pixel values to world-coordinates,
   wherein the method further comprises the steps of:
   rectifying the converted range data by re-sampling the range data onto a uniformly spaced grid in the world coordinates;
   analyzing the converted and rectified range data in order to obtain the three-dimensional characteristics of said object,
   wherein the configuration of the range data analysis comprises basic analysis tasks having at least one input parameter and at least one output result value, whereby the output result value from a first analysis task is used as input parameter to a second analysis task.

2. A method according to claim 1, wherein, the method further comprises the step of identifying pixel positions in the created image where valid data is missing.

3. A method according to claim 2, wherein, the method further comprises the step of ignoring the identified pixel positions in the created image where data is missing.

4. A method according to claim 2, wherein, the method further comprises the step of filling the identified pixel positions in the created image where data is missing with range values estimated from the valid pixels around the pixels where data is missing using interpolation and/or extrapolation.

5. A method according to claim 1, wherein, the method further comprises the step of acquiring grayscale intensity data from the created image of said object.

6. A method according to claim 1, wherein, the method further comprises the step of measuring the scatter properties of the object surface.

7. A method according to claim 1, wherein, the step of creating an image of said object is done using triangulation.

8. An imaging apparatus for measuring three-dimensional characteristics of an object using range data acquisition and analysis, comprising:
   means for configuring the range data acquisition and analysis before starting the measuring;
   means for creating an image of said object by detecting reflected light from said object using at least one sensor comprising pixels;
   means for acquiring range data of said object from the created image measured in sensor pixel units;
   means for converting the acquired range data from sensor pixel values to world-coordinates,
   wherein the imaging apparatus further comprises:
   means for rectifying the converted range data by re-sampling the range data onto a uniformly spaced grid in the world coordinates;
   means for analyzing the converted and rectified range data in order to obtain the three-dimensional characteristics of said object,
   wherein the configuration of the range data analysis comprises basic analysis tasks having at least one input parameter and at least one output result value, whereby the output result value from a first analysis task is used as input parameter to a second analysis task.

9. An imaging apparatus according to claim 8, wherein, the imaging apparatus further comprises means for identifying pixel positions in the created image where data is missing.

10. An imaging apparatus according to claim 9, wherein, the imaging apparatus further comprises means for ignoring the identified pixel positions in the created image where data is missing.

11. An imaging apparatus according to claim 9, wherein, the imaging apparatus further comprises means for filling the identified pixel positions in the created image where data is missing with range values estimated from the valid pixels around the pixels where data is missing using interpolation and/or extrapolation.

12. An imaging apparatus according to claim 8, wherein, the imaging apparatus further comprises means for acquiring grayscale intensity data from the created image of said object.

13. An imaging apparatus according to claim 8, wherein, the imaging apparatus further comprises means for measuring the scatter properties of the object surface.

14. An imaging apparatus according to claim 8, wherein, the imaging apparatus is a stand-alone unit.

* * * * *